Aug. 26, 1952 J. J. VANDERCOOK Re. 23,541

GIRDLE

Original Filed Nov. 23, 1948

INVENTOR
JUANITA J. VANDERCOOK

BY C. F. Birkenbeuel.

ATTORNEY

Reissued Aug. 26, 1952 Re. 23,541

UNITED STATES PATENT OFFICE 23,541

GIRDLE

Juanita J. Vandercook, Portland, Oreg.

Original No. 2,575,605, dated November 20, 1951, Serial No. 61,653, November 23, 1948. Application for reissue February 28, 1952, Serial No. 273,939

4 Claims. (Cl. 2—41)

Matter enclosed in heavy brackets [ ] appears in the original patent but forms no part of this reissue specification; matter printed in italics indicates the additions made by reissue.

This invention relates generally to wearing apparel and particularly to a girdle of special use in maternity cases.

The main object of this invention is to construct a girdle which will provide comfort and support to the wearer without either detracting from its usefulness.

I accomplish this and other objects in the manner set forth in the following specification as illustrated in the accompanying drawings, in which.

Like numbers of reference refer to the same or similar parts throughout the several views.

Figure 2:
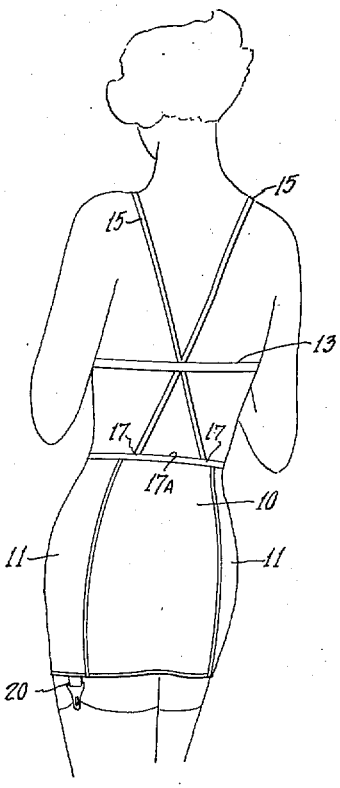
Fig. 2 is a rear elevation showing the girdle in place on the wearer.
Figure 1:
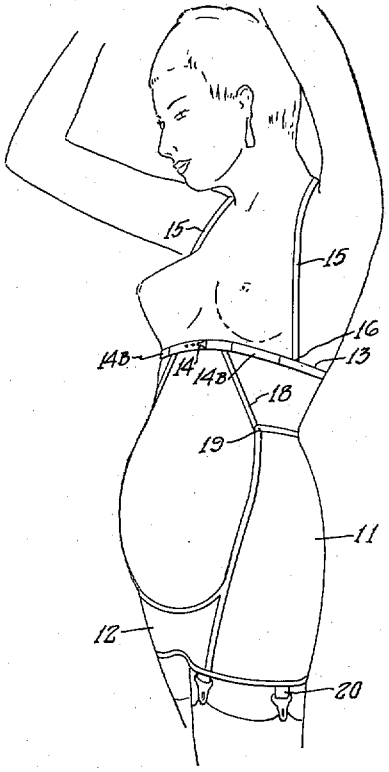
Fig. 1 is a perspective view from the front quarter showing the device in place on the wearer.
Figure 3:
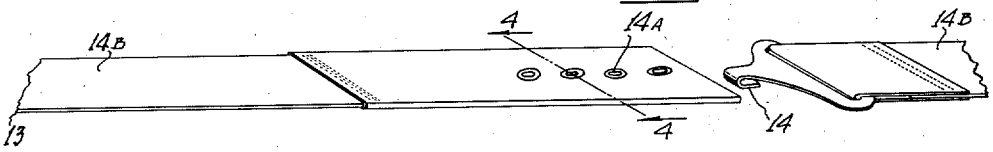
Fig. 3 is an enlarged perspective view of the hook and eye fastening.
Figure 4:
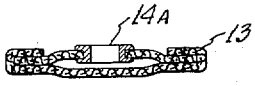
Fig. 4 is a fragmentary section taken along the lines 4—4 of Fig. 3.

Referring in detail to the drawing, there is shown a girdle consisting of the usual stretchless back section 10 and yieldable or elastic side sections 11 and the very low cut front section 12 which is little more than a band.

The usual fabrics may be employed in the construction of the girdle.

Under the bust of the wearer is placed a chest band 13 having a hood fastener 14 adapted to engage any of the holes 14–A in the end of 14–B of the strap 13. It is desirable to make the ends 14–B of elastic material. Elastic suspender straps 15 intersect at the back with the bust band 13 and extend forwardly over the shoulders to a point of fastening 16 along the outer sides of the breasts. The fasteners 16 are at the sides of the bust band 13. The lower ends 17 of the straps 15 are secured to the girdle edge 17–A.

Elastic stay straps 18 fasten the front upper corners 19 to the elastic band 13 near the hood 14. The usual hose supporters 20 are provided but form no part in the present invention.

It can be seen from the foregoing that the body of the wearer receives the needed support without objectionably confining or compressing the abdomen and that the weight supported is transferred to the shoulders of the wearer instead of remaining as a drag on the lower part of the body.

I am aware that numerous forms of girdles have been constructed in the past. I, therefore, intend to cover only such forms and modifications of my invention as fall fairly within the appended claims.

I claim:

1. A girdle comprising a pair of elastic side sections extending from the waistline to below the hips of the wearer, a stretchless back section secured between said side sections, a narrow horizontally extending front panel connecting lower vertical edges of said elastic side panels corresponding to the lower portions of the abdomen of the wearer, a bust band adapted to be worn directly beneath the bust of the wearer, elastic stay straps from the front central portion of said sponding to the lower portion of the abdomen ber, and suspender straps attached to the sides of said bust band and extending over the shoulder and crossing at the middle of the back of the bust band and fastened at two spaced points at the top of said back.

2. *A girdle comprising a pair of elastic side sections extending from the waistline to below the hips of the wearer, a back section secured between said side sections, a narrow horizontally extending front panel connecting lower vertical edges of said elastic side panels corresponding to the lower portion of the abdomen of the wearer, a bust band adapted to be worn directly beneath the bust of the wearer, elastic stay straps from the front central portion of said bust band to the upper portion of the side member, and suspender straps attached to the sides of said bust band and extending over the shoulder and crossing at the middle of the back of the bust band and fastened at two spaced points at the top of said back.*

3. *A maternity girdle characterized by its foundation effects and body control with a completely open area in the region of the abdomen to obviate compression of the normal area of enlargement during pregnancy comprising side and back portions extending from the waistline to below the hips of the wearer of which at least the side portions are elastic to give control to the thighs and buttocks, a narrow front portion adapted to be positioned below the abdomen and connected to said side portions at the lower part thereof, said side portions having front edges defining with the upper edge of said front portion an opening in the garment in the region of the abdomen, said side portions having upper corner portions located at the waistline, shoulder supporting strap structure connected to the upper edge of said back portion and to said upper corner portions, that part of said strap structure connected to said corner portions extending upwardly therefrom and converging toward the front of the garment above the abdominal opening to tension said corners of said side portions*

*and said back portion to the body of the wearer in the region of the waistline.*

*4. A maternity girdle characterized by its foundation effects and body control with a completely open area in the region of the abdomen to obviate compression of the normal area of enlargement during pregnancy comprising side and back portions extending from the waistline to below the hips of the wearer of which at least the side portions are elastic to give control to the thighs and buttocks, a narrow front portion adapted to be positioned below the abdomen and connected to said side portions at the lower part thereof, said side portions having front edges defining with the upper edge of said front portion an opening in the garment in the region of the abdomen, said side portions*

*having upper corner portions located at the waistline, and means for supporting the girdle from the shoulders of the wearer connected to said upper corner portion and said back portion.*

JUANITA J. VANDERCOOK.

REFERENCES CITED

The following references are of record in the file of this patent or the original patent:

UNITED STATES PATENTS

| Number | Name | Date |
|---|---|---|
| 2,166,312 | Lunney | July 18, 1939 |
| 2,169,080 | Clark | Aug. 8, 1939 |
| 2,315,930 | Burke | Apr. 6, 1943 |
| 2,440,982 | Speller et al. | May 4, 1948 |